United States Patent [19]

Hayashi

[11] Patent Number: 4,727,762
[45] Date of Patent: Mar. 1, 1988

[54] DRIVING FORCE SUPPORT FOR LINEAR ACTUATOR

[75] Inventor: Shuji Hayashi, Osaka, Japan

[73] Assignee: Tsubakimoto Chain Co., Osaka, Japan

[21] Appl. No.: 914,665

[22] Filed: Oct. 2, 1986

[30] Foreign Application Priority Data

Jan. 7, 1986 [JP] Japan .................. 61-133[U]

[51] Int. Cl.$^4$ .................. F16C 19/08; F16H 25/20
[52] U.S. Cl. .................. 74/89.15; 74/412 TA; 384/517
[58] Field of Search ............... 74/89.15, 425, 412 TA; 384/196, 198, 215, 223, 218, 219, 517, 518, 535, 581, 620

[56] References Cited

U.S. PATENT DOCUMENTS

| | | | |
|---|---|---|---|
| 1,881,750 | 10/1932 | Llewellyn | 384/518 |
| 2,387,105 | 10/1945 | Yager | 384/518 |
| 2,850,337 | 9/1958 | McCallum | 384/518 |
| 3,242,756 | 3/1966 | Fry | 74/425 |
| 3,339,426 | 9/1967 | Borggrafe | 74/425 |
| 3,435,696 | 4/1969 | Carr | 74/425 |
| 3,523,599 | 8/1970 | Denkowski | 74/425 |
| 3,851,538 | 12/1974 | Denkowski et al. | 74/425 |
| 3,968,705 | 7/1976 | Amano et al. | 74/412 TA |
| 4,173,376 | 11/1979 | Standing et al. | 384/517 |
| 4,529,324 | 7/1985 | Champagne et al. | 384/518 |
| 4,652,219 | 3/1987 | McEachern et al. | 384/518 |

FOREIGN PATENT DOCUMENTS 2140607 2/1973 Fed. Rep. of Germany ........ 74/425

Primary Examiner—Lawrence J. Staab
Attorney, Agent, or Firm—Howson and Howson

[57] ABSTRACT

This improved driving force support is used in a linear actuator in which rotary motion of a rotating screw shaft is converted to linear motion of a travelling nut. The driving force support comprises a pair of springs surrounding the rotating shaft and held in compression between a pair of shaft bearing receivers. The receivers and bearings held thereby move axially with the rotating shaft as axial forces are applied to the shaft by the travelling nut. The bearing receivers slide axially in a hollow housing. The springs are arranged in series between seats which normally abut the respective bearing receivers and also normally abut stop surfaces in the housing. One spring has a high degree of stiffness, and the other has a comparatively low degree of stiffness. An intermediate seat between the springs has a projection which abuts the seat on the opposite end of the weaker spring to limit the flexure of the weaker spring, while allowing it to compress as the bearing receivers move axially through a short distance. When the driving force exceeds a predetermined limit, the resulting axial movement of the bearing receivers is detected by a limit switch, which can be used to stop the actuator. During stopping, further rotation of the shaft results in compression of the stronger spring until the rotation stops.

1 Claim, 1 Drawing Figure

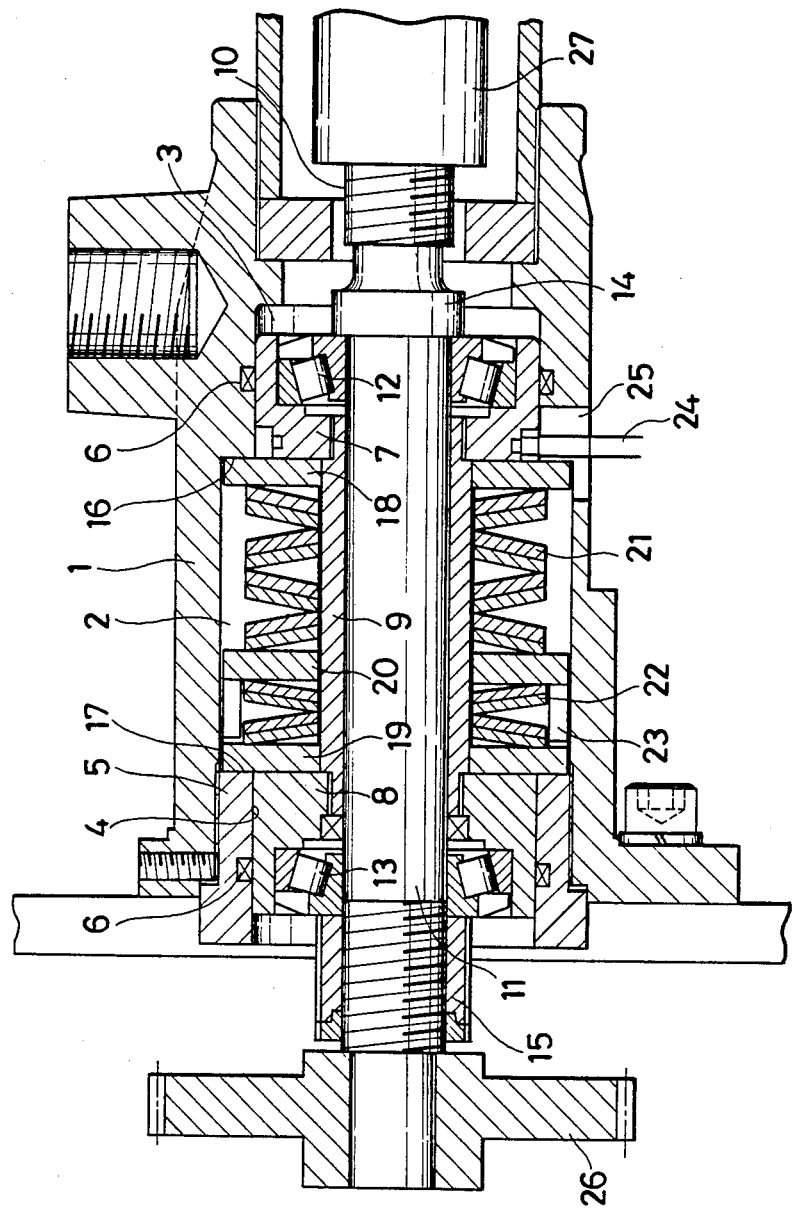

DRIVING FORCE SUPPORT FOR LINEAR ACTUATOR

BRIEF SUMMARY OF THE INVENTION

This invention relates to a driving force support for a linear actuator of the kind in which rotary motion, usually imparted by an electric motor, is converted to linear motion by a screw shaft having a travelling nut. The invention relates more particularly to the structure of a driving force support which is capable of advantageously detecting an overload on, and lessening the impact force on, the rotatable screw shaft of the actuator.

A conventional driving force support for an electrically operated linear actuator comprises a spring having a high degree of stiffness held under a set prepressure, and an adjustable limit switch. The spring is typically a Belleville spring, consisting of a stack of Belleville washers. Because of the high degree of spring stiffness, in order to detect overloads with accuracy and to provide for easy adjustment of the limit by repositioning the limit switch, it is necessary to allow for a significant degree of spring deflection before the limit switch operates. To obtain this effect the spring must be of considerable length. This increases the total length of the actuator.

Whenever the actuator is operating against a load, the spring of the driving force support is deflected to some degree depending on the load. When the load-pushing member of the actuator collides with a stop, i.e. an immovable obstacle, the collision is detected, and a braking force is normally applied to the rotating parts of the actuator. The time lag between the collision and operation of the limit switch, the time lag in operation of the brake, and the continued rotation of the rotatable parts during braking, require still further flexure of the spring. During such an interruption, the force applied to the spring may reach a level several times as high as the rated force, though the force varies depending upon the speed of the linearly moving elements of the actuator. Therefore, to maintain a sufficiently long useful life of the spring, it is considered necessary to restrict the flexure of the spring to not more than about 75% of its limit of flexure. For this and various other reasons, it has been the conventional practice to construct a driving force support spring from a stacked series of Belleville washers, each of which has a small degree of flexure and a large thickness.

One object of this invention is to provide a driving force support for a linear actuator, which is free from the above-mentioned problems encountered in a conventional driving force supports.

The support in accordance with the invention comprises a body having a larger diameter cylindrical cavity, with smaller diameter cylindrical cavities formed coaxially with and on the front and rear sides of the larger diameter cavity. Front and rear metal bearing receivers are guided and slidable axially in the smaller diameter cavities. An electrically rotatable screw shaft is supported in bearings held in the slidable bearing receivers so that an intermediate portion of the screw shaft moves as a unit with the bearings and receivers as they slide axially. Front and rear spring seats are provided in the larger diameter cavity of the body so that the spring seats normally contact radial surfaces of the bearing receivers facing inwardly toward the large diameter cavity, as well as the inwardly facing end surfaces of the larger diameter cavity. A first compression spring having a high degree of stiffness, and a second compression spring having a limited flexure and a relatively small degree of stiffness, are provided in series under a set prepressure between the front and rear spring seats. The driving force of the electrically rotatable screw shaft is detected on the basis of the axial movements of the bearing receivers.

When the level of the driving force applied to the screw shaft exceeds the set prepressure, the second compression spring having a small stiffness, and the first compression spring having a large stiffness, are compressed simultaneously. However, since the flexure of the second compression spring is larger than that of the stiffer spring, the bearings move axially through a distance such that an excessive driving force can be detected easily and accurately.

When the load pushing member of the actuator presses against a stop, the flexure of the compression spring having the smaller stiffness reaches a limit level immediately after the excessively large driving force has been detected as mentioned above. The maximum driving force which occurs upon impact of the load pushing member of the actuator against a stop is then lessened and absorbed by reason of the flexure of the compression spring having the larger stiffness.

BRIEF DESCRIPTION OF THE DRAWING

The accompanying drawing is a longitudinal section of the principal portion of a driving force detecting section of an electrically operated linear actuator in accordance with the invention.

DETAILED DESCRIPTION

Structural body 1 is located adjacent to the position where the linearly movable part of the actuator meets the rotating part. The body has a large diameter cylindrical interior cavity 2, a front smaller diameter cylindrical cavity 3 formed coaxially with cavity 2 at one end, and a ring 5 fitting into the opposite end of cavity 2 and held there by set screws. Ring 5 has a rear smaller diameter cavity 4, the inner diameter of which is equal to that of the front smaller diameter cylindrical cavity 3. Metal bearing receivers 7 and 8 fit closely in the smaller diameter cylindrical cavities 3 and 4 so that the bearing receivers 7 and 8 can slide axially therein. The bearing receivers slide through packing rings 6 provided in grooves in the walls of the smaller diameter cavities. An intermediate portion 11 of a rotatable screw shaft 10 is inserted through a pipe 9. Metal bearing receivers 7 and 8 are threaded onto opposite ends of pipe 9 and thereby rigidly connected to each other. Portion 11 of the screw shaft is supported on conical roller bearings 12 and 13 held in the metal bearing receivers 7 and 8 respectively. A flange 14, formed at the front end of the shaft portion 11, and a hardened lock nut 15 threaded to the rear end of shaft portion 11, are in contact with the outer side surfaces of the inner races of the bearings 12 and 13 respectively and hold the shaft, bearings and bearing receivers in axially fixed relationship to one another, while allowing the shaft to rotate in the bearings and also allowing the bearing receivers to slide axially in body 1 along with the shaft. The position of the ring 5 is chosen so that the radial inner faces of the bearing receivers 7 and 8 are aligned with the front end surface 16 of the larger diameter cavity 2 and with inner end surface 17 of ring 5, respectively.

Ring-shaped spring seats 18 and 19, and an intermediate spring seat 20, through which the pipe 9 is inserted, are installed in the larger diameter cavity 2. A first Belleville compression spring 21 having a high degree of stiffness is provided between the spring seats 18 and 20. A second Belleville compression spring 22 having a smaller stiffness is situated between spring seats 19 and 20. Both springs are placed under a set prepressure, which is equal to the rated driving force of screw shaft 10. To restrict flexure of compression spring 22 to about 75% of a maximum degree of flexure thereof, taking the lifetime of the spring into consideration, a spacer 23 is provided on a rear surface of the spring seat 20 and projects rearwardly therefrom.

A driving force detecting striker 24, fixed to bearing receiver 7, projects outward through an axially elongated slot 25 formed in body 1. Two limit switches (not shown) attached to the outer side of body 1 are operated upon with longitudinal movement of striker 24.

Rotatable screw shaft 10 is rotated at a reduced speed by an electric motor (not shown) via a gear 26 to cause nut 27, which is threaded on screw shaft 10, to move axially as the shaft rotates. The nut is connected to an actuator rod (not shown) which projects and retracts, depending on the direction of rotation of the screw shaft.

As the actuator rod moves in the projecting direction, if the driving force acting through the rod exceeds the level of a rated driving force, the assembly consisting of intermediate portion 11 of the shaft, bearings 12 and 13, bearing receivers 7 and 8, pipe 9 and spring seat 18 moves rearwardly as a unit as a result of the reaction force. Compression spring 21 and intermediate spring seat 20 also move rearward as a result of the reaction force while spring 22 is compressed. Since the spring 22 has a small stiffness and a large degree of flexure, bearing receiver 7, and with it striker 24, move rearwardly a substantial distance, so that the limit switches can be operated reliably.

When the driving force on the actuator rod acts in a direction opposite to the above-mentioned direction to exceed the level of the rated driving force, that fact is also detected by the same operation of parts as mentioned above, with striker 24 moving forwardly to actuate another limit switch.

When the rod is pressed against a stationary object so as to be stopped, spring 22 is deflected greatly because of the inertia of the rotating parts. This causes spacer 23 to contact spring seat 19, so that the limit switches are operated.

Even if the driving force due to inertia becomes excessive before the limit switches cause the brake to be applied to stop rotation of screw shaft 10, compression spring 21 absorbs the reaction force and the shaft stops rotating gradually.

According to the invention a spring means is compressed by the rotatable screw shaft when the driving force exceeds a rated level and the excess driving force is thereby detected. The spring means is also compressed when the load-pushing member of the actuator presses against a stop. The spring means comprises a combination of a spring having a small stiffness, and a spring having a large stiffness. Consequently, the axial length of the housing of the spring means can be reduced. Moreover, an excess of the driving force over a set rated level can be detected accurately and easily, and an excessively large reaction force occurring upon impact of the actuator rod against a stop is accommodated.

I claim:

1. In a linear actuator comprising a motor-driven screw shaft having a thrust-bearing nut threaded thereon and movable along the axis of the screw shaft as the screw shaft rotates, a driving force support comprising a hollow structure body having a larger diameter cylindrical cavity, and smaller diameter cylindrical cavities coaxial with and on the front and rear sides of said larger diameter cavity, front and rear bearing receivers having inner side surfaces, said bearing receivers being guided and slidable axially in said smaller diameter cavities, bearings within said bearing receivers, said rotatable screw shaft being supported on said bearings and secured thereto and to the bearing receivers so that an intermediate portion of said screw shaft moves as a unit with said bearing receivers as they slide axially, front and rear spring seats provided in said larger diameter cavity, said spring seats normally contacting the inner side surfaces of said bearing receivers and the end surfaces of said larger diameter cavity, a compression spring having a high degree of stiffness and a compression spring having a limited degree of flexure and a smaller degree of stiffness, said springs being provided in series under a set prepressure between said front and rear spring seats, and means for detecting movement of said bearings and thereby detecting the driving force of the rotatable screw shaft.

* * * * *